United States Patent [19]

Sumi

[11] Patent Number: 5,050,223
[45] Date of Patent: Sep. 17, 1991

[54] METHOD OF AND APPARATUS FOR PROCESSING IMAGE SIGNAL

[75] Inventor: Katsuto Sumi, Kanagawa, Japan

[73] Assignee: Fuji Photo Film Co., Ltd., Kanagawa, Japan

[21] Appl. No.: 423,477

[22] Filed: Oct. 18, 1989

[30] Foreign Application Priority Data

Oct. 20, 1988 [JP] Japan .................. 63-265601

[51] Int. Cl.$^5$ .................................. G06K 9/00
[52] U.S. Cl. ............................. 382/54; 382/22; 382/50; 358/166; 358/447; 328/135
[58] Field of Search .......... 358/166, 447; 382/22, 382/50, 54; 328/135; 350/316

[56] References Cited

U.S. PATENT DOCUMENTS

| | | | |
|---|---|---|---|
| 3,920,889 | 11/1975 | Conner | 358/166 |
| 4,081,836 | 3/1978 | Skinner | 358/166 |
| 4,918,528 | 4/1990 | Oohashi | 358/162 |
| 4,953,114 | 8/1990 | Sato | 382/50 |

Primary Examiner—David K. Moore
Assistant Examiner—Daniel Santos
Attorney, Agent, or Firm—Sughrue, Mion, Zinn, Macpeak & Seas

[57] ABSTRACT

A new image ($S'_{ij}$) is generated from an image signal ($S_{ij}$) by determining whether the configuration of the distribution of the image signal ($S_{ij}$) at a point of interest (i, j) is upwardly convex, or a downwardly convex, or otherwise, employing, as the new image signal ($S'_{ij}$), the original image signal ($S_{ij}$) at the point of interest (i, j) if the configuration is upwardly convex or downwardly convex, and employing, as the new image signal ($S'_{ij}$), an unsharp signal ($U_{ij}$) if the configuration is otherwise. A differential signal ($S_{ij} - U_{ij}$), or an absolute signal $|S_{ij} - U_{ij}|$, or a square signal $((S_{ij} - U_{ij})^2)$, or a Laplacian signal ($\nabla^2 S_{ij}$) is compared with a threshold signal (T) to determine whether the configuration of the distribution of the image signal ($S_{ij}$) at a point of interest (i, j) is upwardly convex, or a downwardly convex, or otherwise. The unsharp signal ($U_{ij}$) comprises an average signal ($U_{aveij}$) or a median signal ($U_{medij}$) in a region including the point of interest (i, j). A sharpness emphasizing signal ($S^*_{ij}$) is calculated from the new image signal ($S'_{ij}$) and the unsharp signal ($U_{ij}$) according to the equation:

$$S^*_{ij} = S'_{ij} + K(S'_{ij} - U_{ij})$$

where K is a coefficient signal.

12 Claims, 9 Drawing Sheets

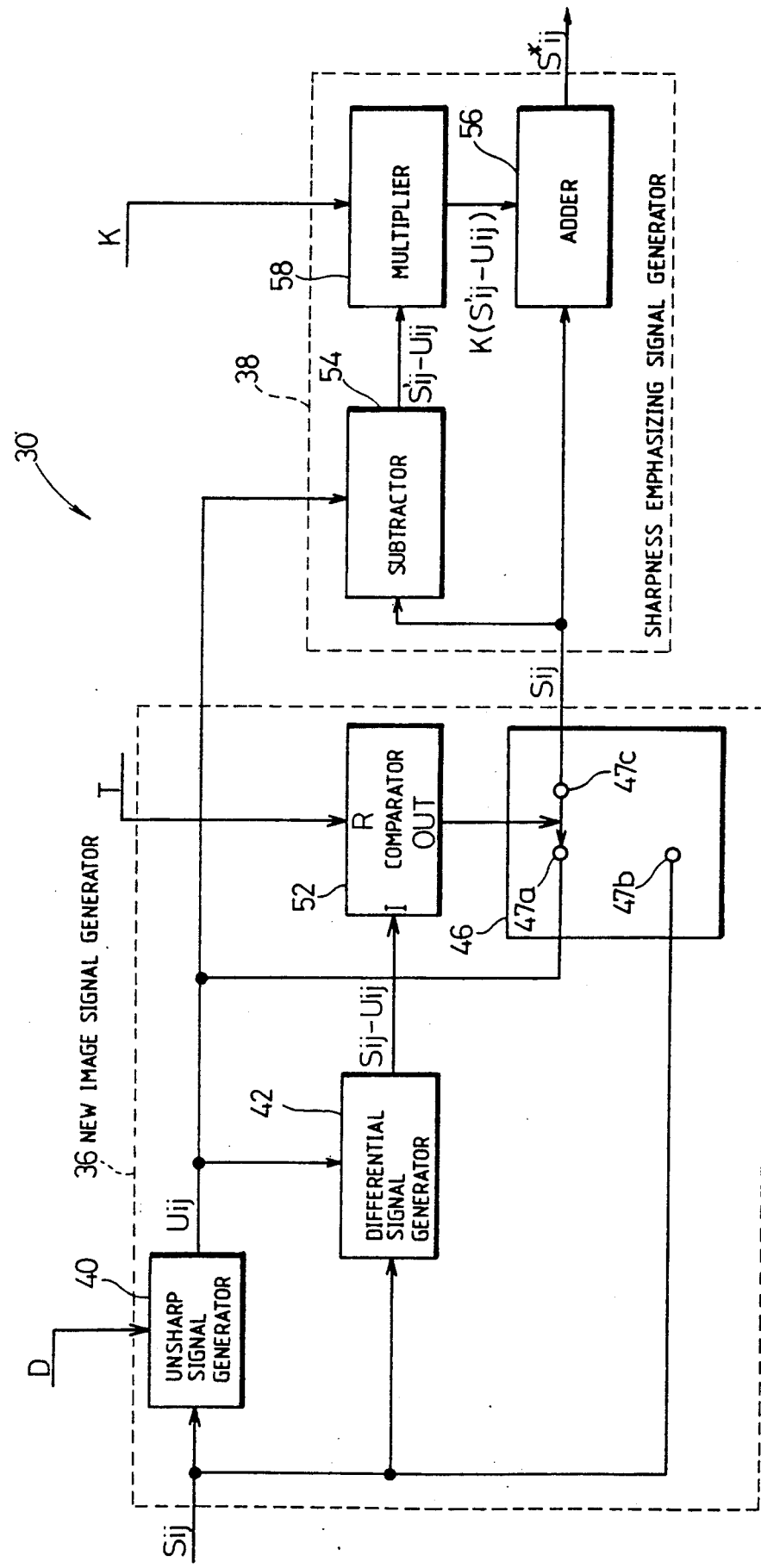

FIG. 5(e)

METHOD OF AND APPARATUS FOR PROCESSING IMAGE SIGNAL

BACKGROUND OF THE INVENTION

The present invention relates to a method of and an apparatus for processing an image signal, and more particularly to a method of and an apparatus for processing an image signal for sharpness emphasis in an image scanning processing apparatus such as platemaking scanners, facsimile machines, or the like.

Image scanning reading and reproducing systems are widely used in the printing and platemaking industries for electrically processing image information of originals or subjects to produce original film plates with a view to simplifying the entire process and improving the quality of printed images.

The image scanning reading and reproducing systems are basically constructed of an image reading apparatus and an image recording apparatus. In the image reading apparatus, image information of an original or subject which is fed in an auxiliary scanning direction is scanned in a main scanning direction substantially normal to the auxiliary scanning direction, and the scanned image information is converted to an electric signal. Then, the photoelectrically converted image information is processed according to platemaking conditions. Thereafter, the processed image signal is converted to a light signal such as a laser beam signal which is applied to and recorded on an image recording medium of a photosensitive material such as a photographic film in the image recording apparatus. The image recording medium with the image recorded thereon is developed by an image developing device and will be used as a film plate for printing.

If the image on an original is a halftone image such as a photographic image, the image scanning reading and reproducing system effects a sharpness emphasizing process on the image by sharpening the profile of the image for making the image easier to see. The sharpness emphasis is carried out as shown in FIG. 1 of the accompanying drawings, for example. Before an image signal S is processed for sharpness emphasis, $(n \times n)$ image signals are extracted from around the image signal S, and averaged to generate a local average signal U. Then, a signal $S-U$ indicative of the difference between the image signal S and the local average signal U is determined, and then multiplied by a coefficient signal K. The product is added to the image signal S. As a result, an image signal S which has been processed for sharpness emphasis (hereinafter referred to as a "sharpness emphasized signal") is obtained as defined by:

$$S^* = S + K \cdot (S - U) \quad (1)$$

A halftone image such as a photographic image is further processed so as to produce a halftone dot image after it has been processed for sharpness emphasis. More specifically, the sharpness emphasized signal S* is converted to a binary signal based on a given halftone dot signal, and a halftone dot image which has been processed for sharpness emphasis is produced on an image recording medium by the binary signal.

The original which bears the image may have a defect produced when the original was formed, a mark or trace of the edge of a photoprint glued thereto, or a deposit of dust or dirt. If the original suffers such a defective condition, then an image signal read by a photosensor is made up of a mixture of a signal component $S_O$ having a larger amplitude and a noise component $S_N$ having a smaller amplitude which is caused by the defective condition, as shown in FIG. 2(a). Consequently, as shown in FIGS. 2(b) and 2(c), the local mean signal U and the differential signal $S-U$ also contain signal components resulting from the noise component $S_N$. As a result, as shown in FIG. 2(d), the sharpness emphasized signal S* contains a noise component $S^*_N$ which has also been processed for sharpness emphasis, as well as a sharpness emphasized signal $S^*_O$ resulting from the signal component $S_O$. When a halftone dot image is formed on an image recording medium based on the sharpness emphasized signal S* which contains the noise component $S^*_N$, an image based on the sharpness emphasized signal $S^*_O$ and an image based on the sharpness emphasized noise component $S^*_N$ are simultaneously reproduced. The entire combined image thus reproduced is of low quality as the noise component $S_N$ is emphasized.

SUMMARY OF THE INVENTION

It is a general object of the present invention to provide a method of and an apparatus for processing an image signal from the image on an original or subject such that a signal is issued as it is when its level is a predetermined level or higher, and a signal is issued after it is unsharpened when its level is below the predetermined level, so that noise components contained in the image signal are unsharpened whereas signal components are processed for sharpness emphasis, thus reproducing a high-quality image.

Another object of the present invention is to provide a method of processing an image signal by generating a new image signal (S'ij) from an image signal (Sij), comprising the steps of determining whether the configuration of the distribution of the image signal (Sij) at a point of interest (i, j) is upwardly convex, or a downwardly convex, or otherwise, employing, as the new image signal (S'ij), the original image signal (Sij) at the point of interest (i, j) if the configuration is upwardly convex or downwardly convex, and employing, as the new image signal (S'ij), an unsharp signal (Uij) if the configuration is otherwise.

Still another object of the present invention is to provide the method further comprising the step of comparing a differential signal (Sij−Uij) produced by subtracting the unsharp signal (Uij) from the image signal (Sij) with a threshold signal (T) to determine whether the configuration of the distribution of the image signal (Sij) at a point of interest (i, j) is upwardly convex, or a downwardly convex, or otherwise.

Yet another object of the present invention is to provide the method further comprising the step of comparing the absolute value |Sij−Uij| of a differential signal (Sij−Uij) produced by subtracting the unsharp signal (Uij) from the image signal (Sij) with a threshold signal (T) to determine whether the configuration of the distribution of the image signal (Sij) at a point of interest (i, j) is upwardly convex, or a downwardly convex, or otherwise.

Yet still another object of the present invention is to provide the method further comprising the step of comparing the square ((Sij−Uij)²) of a differential signal (Sij−Uij) produced by subtracting the unsharp signal (Uij) from the image signal (Sij) with a threshold signal (T) to determine whether the configuration of the distribution of the image signal (Sij) at a point of interest (i, j) is upwardly convex, or a downwardly convex, or otherwise.

A further object of the present invention is to provide the method further comprising the step of comparing a Laplacian signal ($\nabla^2 Sij$) produced from the image signal (Sij) with a threshold signal (T) to determine whether the configuration of the distribution of the image signal (Sij) at a point of interest (i, j) is upwardly convex, or a downwardly convex, or otherwise.

A still further object of the present invention is to provide the method wherein said unsharp signal (Uij) comprises an average signal (Uaveij) or a median signal (Umedij) in a region including the point of interest (i, j).

A yet further object of the present invention is to provide the method further comprising the step of calculating a sharpness emphasizing signal (S*ij) from the new image signal (S'ij) and the unsharp signal (Uij) according to the equation:

$$S^*ij = S'ij + K(S'ij - Uij)$$

where K is a coefficient signal.

It is also an object of the present invention to provide an apparatus for processing an image signal, comprising unsharp signal generating means for generating an unsharp signal (Uij) from an image signal (Sij), subtracting means for generating a differential signal (Sij−Uij) by subtracting said unsharp signal (Uij) from said image signal (Sij), comparing means for comparing said differential signal (Sij−Uij) with a predetermined constant (T), and new image signal selecting means for selecting either said image signal (Sij) or said unsharp signal (Uij) as a new image signal (S'ij) depending on the result of comparison by said comparing means.

Another object of the present invention is to provide an apparatus for processing an image signal, comprising unsharp signal generating means for generating an unsharp signal (Uij) from an image signal (Sij), subtracting means for generating a differential signal (Sij−Uij) by subtracting said unsharp signal (Uij) from said image signal (Sij), absolute signal generating means for generating an absolute signal |Sij−Uij| indicating the absolute value of said differential signal (Sij−Uij), comparing means for comparing said absolute signal |Sij−Uij| with a predetermined constant (T), and new image signal selecting means for selecting either said image signal (Sij) or said unsharp signal (Uij) as a new image signal (S'ij) depending on the result of comparison by said comparing means.

Still another object of the present invention is to provide an apparatus for processing an image signal, comprising unsharp signal generating means for generating an unsharp signal (Uij) from an image signal (Sij), subtracting means for generating a differential signal (Sij−Uij) by subtracting said unsharp signal (Uij) from said image signal (Sij), square signal generating means for generating a square signal ((Sij−Uij)$^2$) indicating the square of said differential signal (Sij−Uij), comparing means for comparing said square signal ((Sij−Uij)$^2$) with a predetermined constant (T), and new image signal selecting means for selecting either said image signal (Sij) or said unsharp signal (Uij) as a new image signal (S'ij) depending on the result of comparison by said comparing means.

Still another object of the present invention is to provide an apparatus for processing an image signal, comprising unsharp signal generating means for generating an unsharp signal (Uij) from an image signal (Sij), secondary differentiating means for generating a Laplacian signal ($\nabla^2 Sij$) from said image signal (Sij), comparing means for comparing said Laplacian signal ($\nabla^2 Sij$) with a predetermined constant (T), and new image signal selecting means for selecting either said image signal (Sij) or said unsharp signal (Uij) as a new image signal (S'ij) depending on the result of comparison by said comparing means.

Yet another object of the present invention is to provide the apparatus wherein said unsharp signal (Uij) comprises an average signal (Uaveij) or a median signal (Umedij) in a region including the point of interest (i, j).

Yet still another object of the present inventio is to provide the apparatus further comprising subtracting means, multiplying means, and adding means for jointly calculating a sharpness emphasizing signal (S*ij) from the new image signal (S'ij) and the unsharp signal (Uij) according to the equation:

$$S^*ij = S'ij + K(S'ij - Uij)$$

where K is a coefficient signal.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 4 is a block diagram of a sharpness emphasizer in the image signal processing apparatus shown in FIG. 3;

FIGS. 5(a) through 5(f) are diagrams illustrating the operation of the sharpness emphasizer shown in FIG. 4;

DETAILED DESCRIPTION OF THE PREFERRED EMBODIMENTS

Figure 3:
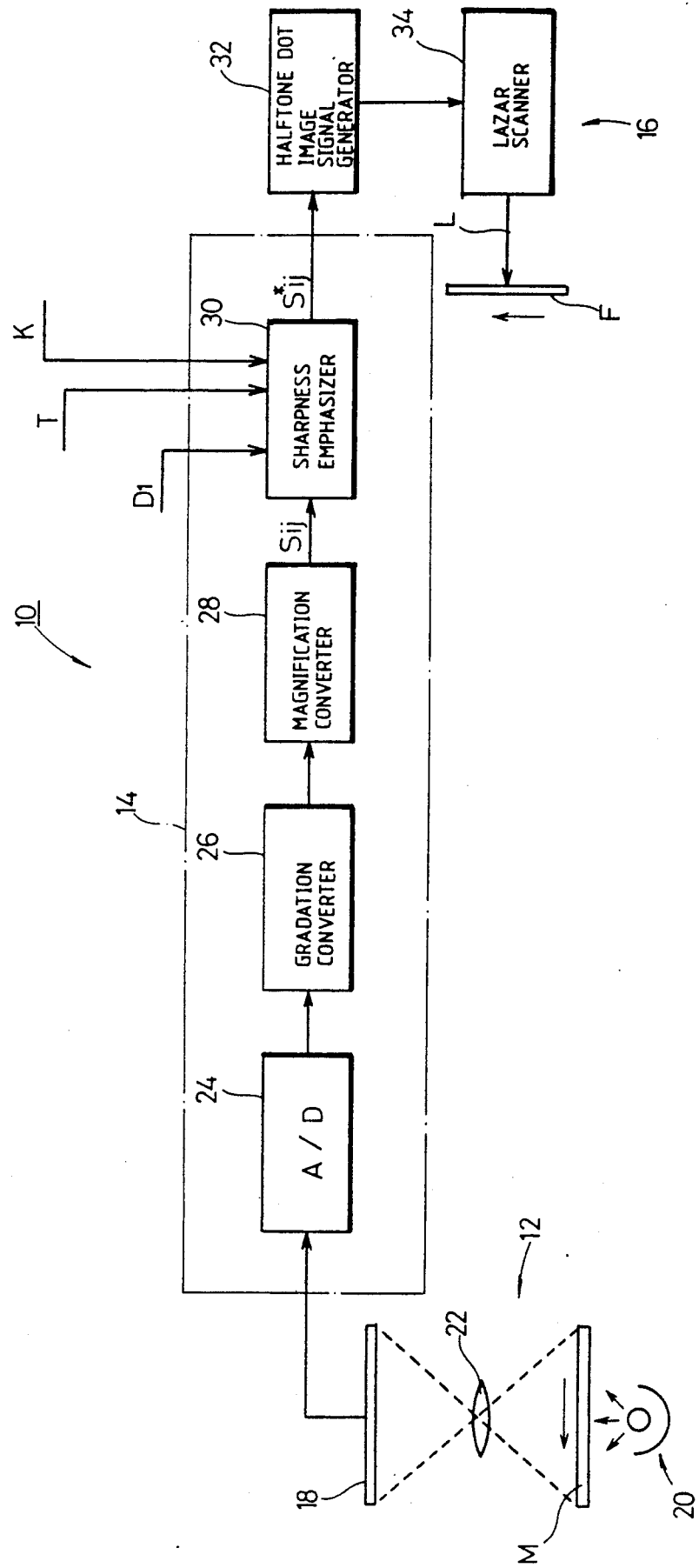
FIG. 3 is a block diagram of an image signal processing apparatus according to the present invention.

As shown in FIG. 3, an image scanning reading and reproducing system 10 to which an image signal processing method according to the present invention is applied is basically constructed of an image reading apparatus 12, an image signal processing apparatus 14, and an image reproducing apparatus 16.

The image reading apparatus 12 has a line sensor 18 comprising a linear array of photoelectric converter elements such as a CCD (charge-coupled device) for converting a light signal to an electric signal. The line sensor 18 reads image information on an original or subject M which is illuminated by a light source 20 and fed in an auxiliary scanning direction normal to the sheet of FIG. 3, by detecting light that has passed through the original M and been converged by a condenser lens 22 in a main scanning direction that is normal to the auxiliary scanning direction.

The image signal processing apparatus 14 comprises an A/D converter 24 for converting an analog signal from the line sensor 18 to a digital signal, a gradation converter 26 for converting the gradation of the digital signal, a magnification converter 26 for converting the magnification of the digital signal, and a sharpness emphasizer 30 for processing a digital image signal Sij from the magnification converter 30 based on mask size data $D_1$, a threshold signal T, and a coefficient signal K and for producing a sharpness emphasized signal S*ij. The mask size data $D_1$ are data corresponding to the type of a blurring mask used for electrically correcting the image signal Sij for sharpness, and correspond to the number of pixels near a point of interest (i, j) in the image signal Sij, which is employed to generate an unsharp signal Uij.

The image reproducing apparatus 16 comprises a halftone dot image signal generator 32 for converting the sharpness emphasized signal S*ij from the sharpness emphasizer 30 to a binary signal of a certain halftone dot size based on a halftone dot signal, and a laser scanner 34 for turning on and off a laser beam L based on the binary signal and deflecting the turned-on/off laser beam L with a light deflector (not shown) to form a halftone dot image on a film F. The film F is fed in an auxiliary scanning direction indicated by the arrow while at the same time being scanned in a main scanning direction normal to the auxiliary scanning direction with the laser beam L, so that image information is two-dimensionally reproduced on the film F.

As shown in FIG. 4, the sharpness emphasizer 30 in the image signal processing apparatus 14 comprises a new image signal generator 36 for generating a new image signal S'ij and a sharpness emphasizing signal generator 38. An image signal Sij generated by the magnification converter 28 (FIG. 3) is applied to an unsharp signal generator 40 serving as an unsharp signal generating means, a differential signal generator 42 serving as a subtracting means, and a second contact 47b of a new image signal selector 46 serving as a new image signal selecting means. The unsharp signal generator 40 generates an unsharp signal Uij based on the mask size data $D_1$, and applies the unsharp signal Uij to the differential signal generator 42, a first contact 47a of the image signal selector 46, and a subtractor 54 serving as a subtracting means in the sharpness emphasizing signal generator 38.

The differential signal generator 42 is essentially a subtractor. A first differential signal Sij−Uij which is an output signal from the differential signal generator 42 is applied to a comparison input terminal I of a comparator 52 serving as a comparing means. The comparator 52 has a reference input terminal R supplied with a threshold signal T. The comparator 52 compares the differential signal Sij−Uij with the threshold signal T, and controls the new image signal selector 46 depending on the result of the comparison such that a common terminal 47c is connected to the contact 47a or 47b.

The new image signal selector 46 essentially comprises a multiplexer, and applies either the unsharp signal Uij or the original image signal Sij, depending on the output signal from the comparator 52, as a new image signal S'ij to the subtractor 54 and one terminal of an adder 56 serving as an adding means in the sharpness emphasizing signal generator 38. A second differential signal S'ij−Uij which is an output signal from the subtractor 54 is multiplied by a coefficient signal K by a multiplier 58 serving as a multiplying means in the sharpness emphasizing signal generator 38. The product K(S'ij−Uij) is then applied to the other input terminal of the adder 56. The adder 56 produces a sharpness emphasized signal S*ij.

The image scanning reading and reproducing system to which the image signal processing method is applied is basically constructed as described above. Operation and advantages of the system will be described below.

Image information borne by the original M illuminated by light from the light source 20 is carried by light that has passed through the original M, and photoelectrically read by the line sensor 18. At this time, the original M is fed in the auxiliary scanning direction by a feed mechanism (not shown), and is also scanned by the line sensor 18 in the main scanning direction indicated by the arrow, so that the image information on the entire surface of the original M is read out.

Then, the image information which has been photoelectrically converted by the line sensor 18 is converted by the A/D converter 24 to a digital image signal which is applied to the gradation converter 26. In the gradation converter 26, the gradation of the digital image signal is converted based on read-out conditions of the image reading apparatus 12 and platemaking conditions of the image reproducing apparatus 16. Then, the gradation-converted image signal is converted in magnification, i.e., enlarged or reduced in size, by the magnification converter 28 based on the platemaking conditions. The image signal Sij which has thus been converted in gradation and magnification is introduced into the sharpness emphasizer 30. The image signal Sij is a digital signal as described above. For a better understanding of the present invention, however, a sharpness emphasizing process which is effected on an analog signal substantially equivalent to the digital image signal by the sharpness emphasizer 30 will be described below.

Figure 1:
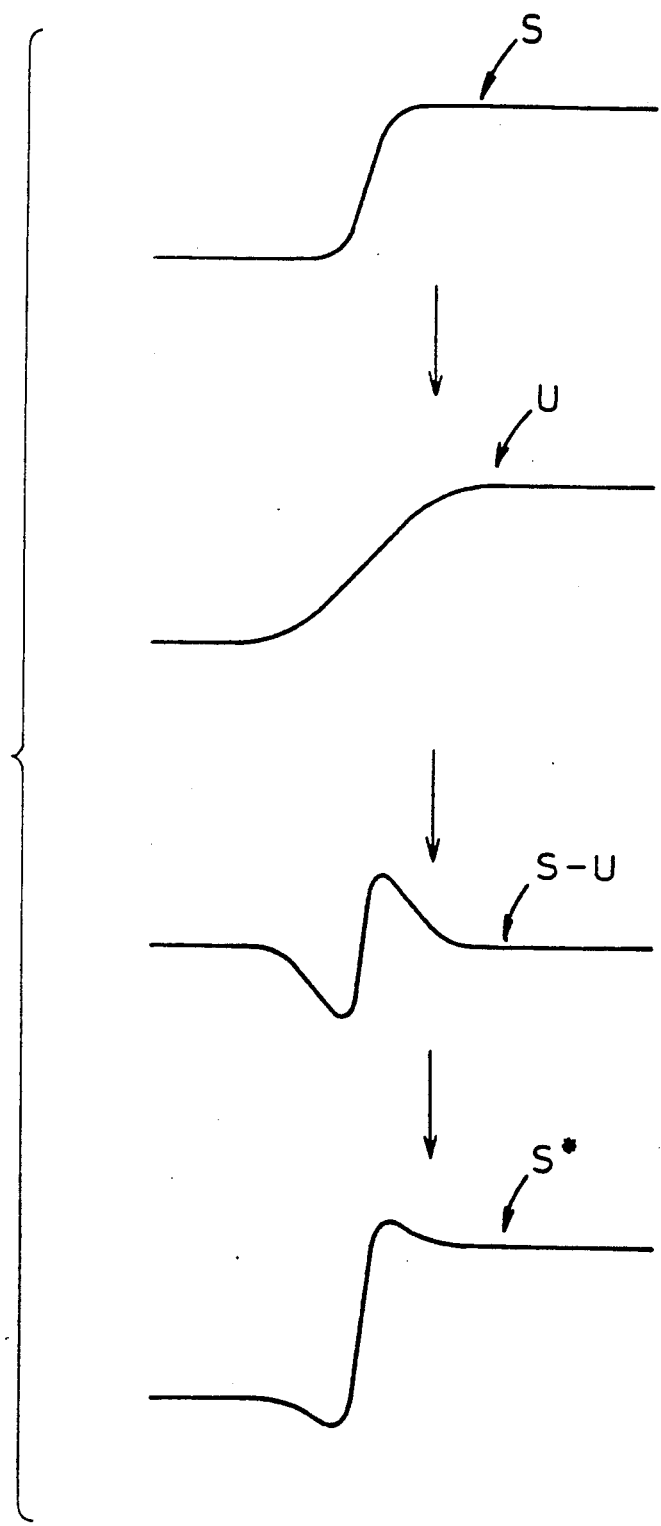
FIGS. 1 and 2(a) through 2(d) are diagrams illustrative of a conventional sharpness emphasis process.
Figure 2:
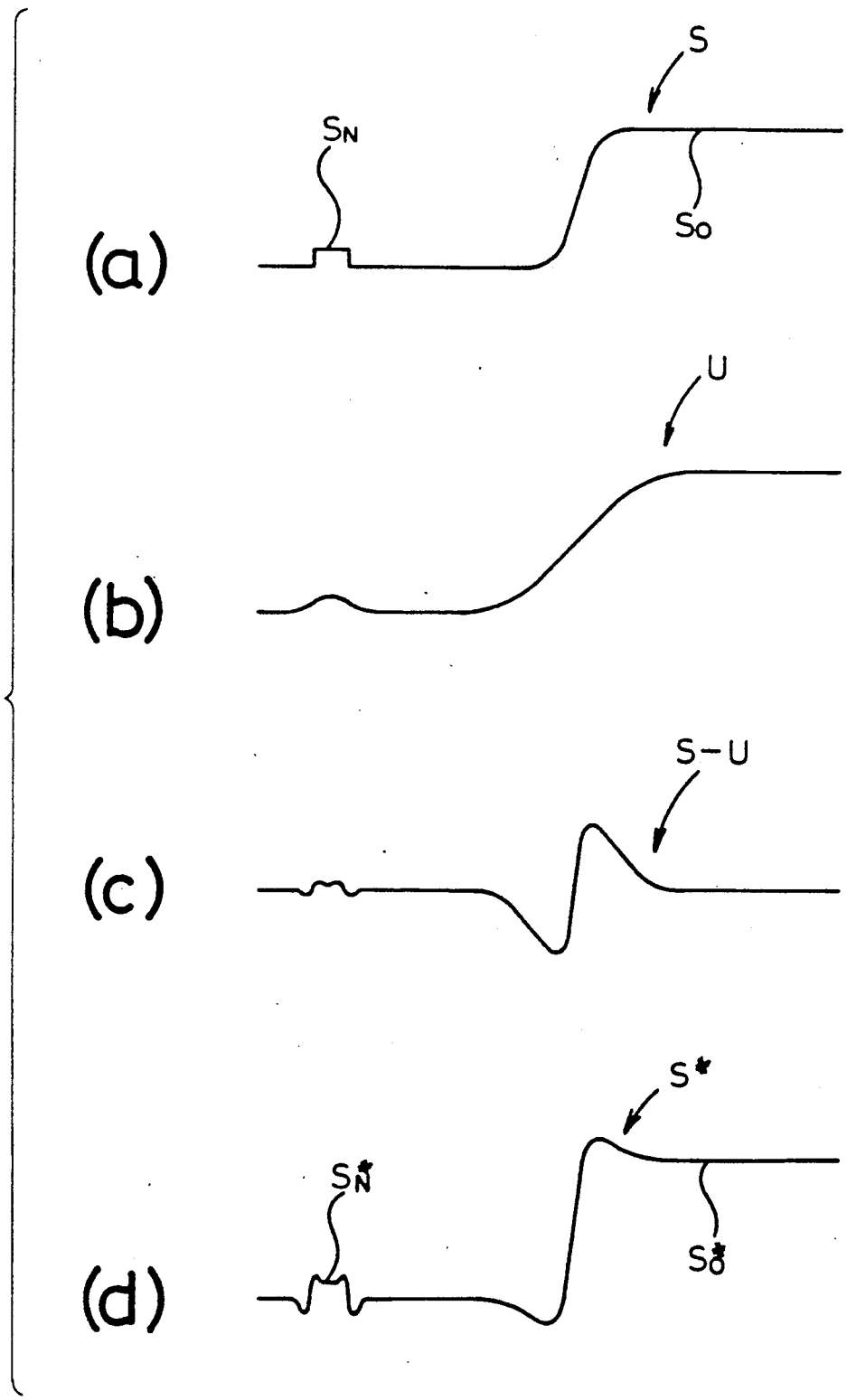
Figure 5A:
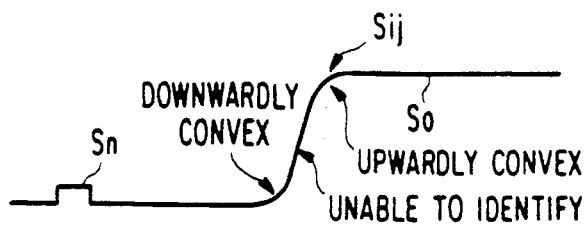

It is assumed in the illustrated embodiment that an image signal Sij is an analog signal comprising a noise component $S_Nij$ and a signal component $S_Oij$ as shown in FIG. 5(a). This image signal Sij is virtually the same as the signal shown in FIG. 2(a). In a region where the signal component $S_Oij$ starts to increase, the derivative of a tangential line of the image signal Sij is gradually increased, i.e., the curve of the image signal Sij is downwardly convex. In a region where the signal $S_Oij$ stops increasing, the derivative of a tangential line of the image signal Sij is gradually reduced, i.e., the curve of the image signal Sij is upwardly convex. The central region of the rising curve of the signal component $S_Oij$ has an inflection point where the curve of the image signal Sij is neither downwardly convex nor upwardly convex.

Figure 6:
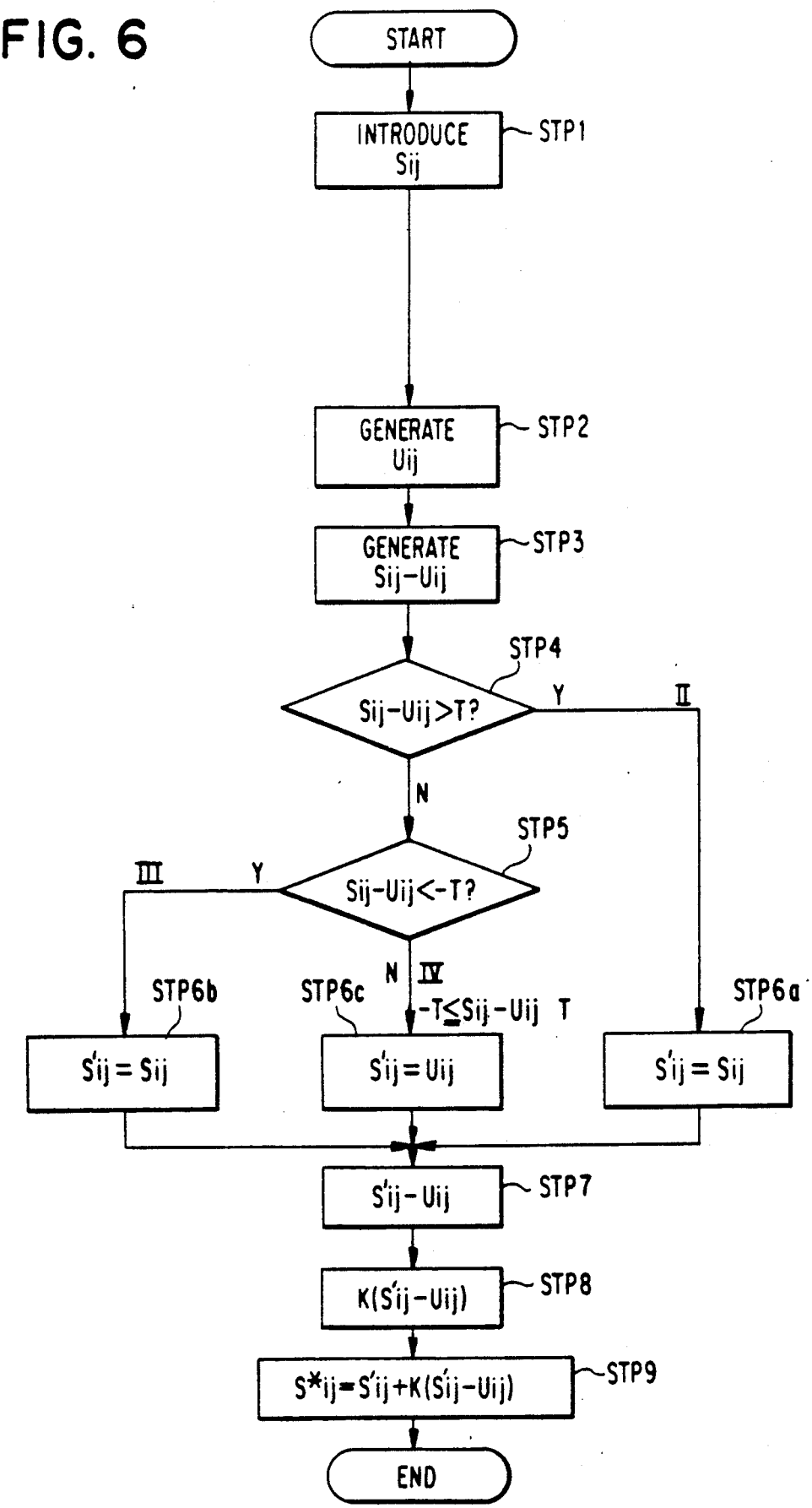
FIG. 6 is a flowchart of the operation of the sharpness emphasizer shown in FIG. 4.

The sharpness emphasizer 30 generates a new image signal S'ij and a sharpness emphasized signal S*ij according a flowchart shown in FIG. 6. The flowchart of FIG. 6 will be described below.

Figure 5B:
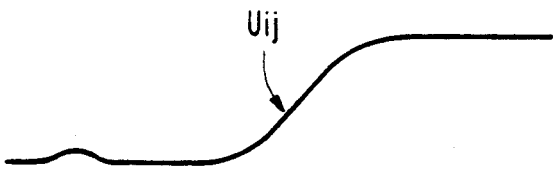

The image signal Sij is applied to the unsharp signal generator 40, the differential signal generator 42, and the second contact 47b of the new image signal selector 46 in a step 1. Then, mask size data $D_1$ are supplied to the unsharp signal generator 40, which generates an unsharp signal Uij (see FIG. 5(b)) as a local average signal based on the average of 11×11 pixel data around the pixel data at a point of interest (i, j) in the image signal, and the unsharp signal Uij is applied to the differential signal generator 42 in a step 2. The data size of the mask size data $D_1$ is not limited to 11×11, but may be 9×9, or 13×13, or the like.

Figure 5C:
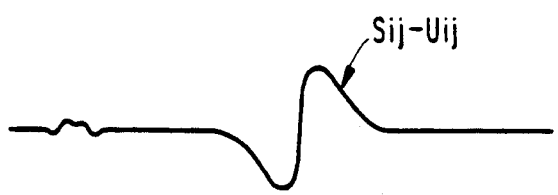

After a differential signal Sij−Uij (see FIG. 5(c)) has been generated by the differential signal generator 42, the differential signal Sij−Uij is applied to the comparison input terminal I of the comparator 52 in a step 3. At this time, the reference input terminal R of the comparator 52 is supplied with a threshold signal T (indicated by the dot-and-dash line in FIG. 5(d)), which indicates zero or a positive constant, entered by the operator through a control panel (not shown), for example. The comparator 52 compares the differential signal Sij−Uij and the threshold signal T according to the following inequalities (2) through (4) in steps 4 and 5:

$$Sij - Uij > T \rightarrow \text{upwardly convex} \quad (2)$$

$$Sij - Uij < -T \rightarrow \text{downwardly convex} \quad (3)$$

$$-T \leq Sij - Uij \leq T \rightarrow \text{otherwise} \quad (4)$$

Figure 5D:
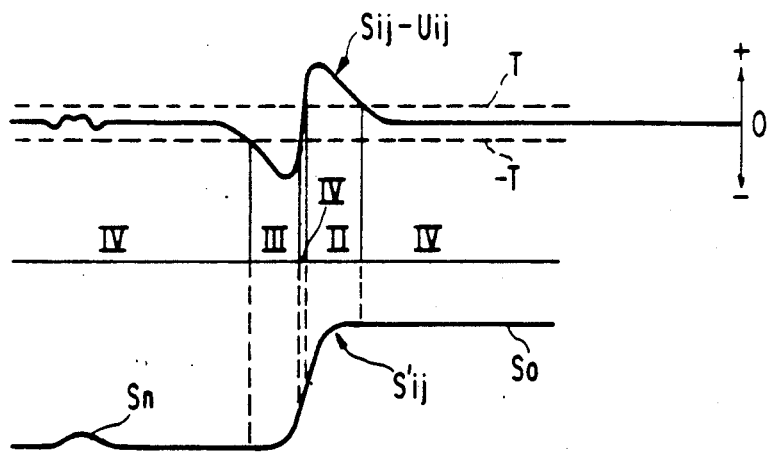

As shown in FIG. 5(d), the inequality (2) is effective in a region II, the inequality (3) in a region III, and the inequality (4) in regions IV. Depending on the regions II, III, and IV, the output terminal OUT of the comparator 52 applies a one-bit binary signal, for example, to an actuator (not shown) for the common contact 47c of the new image signal selector 46.

The common contact 47c is connected to the contact 47a or 47b according to the binary signal which is applied depending on the regions II, III, and IV. Therefore, the actuator for the common contact 47c can be arranged such that a new image signal S'ij is produced by the new image signal selector 46 according to the following equations (5) through (7) in steps 6a, 6b, and 6c. The symbol "→" means an implication (if-then).

$$Sij - Uij > T \rightarrow S'ij = Sij \quad (5)$$

$$Sij - Uij < -T \rightarrow S'ij = Sij \quad (6)$$

$$-T \leq Sij - Uij \leq T \rightarrow S'ij = Uij \quad (7)$$

In the regions II, III shown in FIG. 5(d), therefore, the original image signal Sij is produced from the new image signal selector 46, and in the regions IV, the unsharp signal Uij is produced from the new image signal selector 46 (see FIG. 5(e)).

Then, a second differential signal S'ij−Uij indicating the difference between the new image signal S'ij and the unsharp signal Uij is generated by the subtractor 54 in a step 7. In the multiplier 58, the second differential signal S'ij−Uij is multiplied by a coefficient representing the degree, specified by the operator, to which the image signal is to be emphasized in sharpness, in a step 8.

Then, the adder 56 effects an addition indicated by the equation (8) below, and produces a sharpness emphasized signal S*ij (see FIG. 5(f)) in a step 9:

$$S^*ij = S'ij + K(S'ij - Uij) \quad (8)$$

Therefore, the sharpness emphasized signal S*ij is a signal which is processed according to the equation (9) when the condition Sij−Uij>T or the condition Sij−Uij<−T is effective, and a signal which is processed according to the equation (10) when the condition −T≦Sij−Uij≦T is effective.

$$Sij - Uij > T \rightarrow S^*ij = Sij + K(Sij - Uij)$$
or
$$Sij - Uij < -T \rightarrow S^*ij = Sij + K(Sij - Uij) \quad (9)$$

$$-T \leq Sij - Uij \leq T \rightarrow S^*ij = Uij \quad (10)$$

Figure 5F:
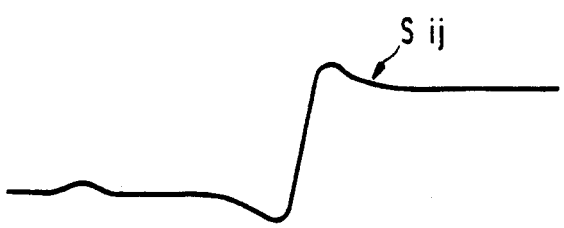

The sharpness emphasized signal S*ij thus generated is such that, as shown in FIG. 5(f), the noise component $S_Nij$ of the image signal Sij is unsharpened, and only the signal component $S_Oij$ of the image signal Sij is sharpened, i.e., processed for sharpness emphasis.

The sharpness emphasized signal S*ij produced by the sharpness emphasizer 30 is then applied to the halftone dot image signal generator 32, which applies a binary signal that is pulse-width-modulated depending on the sharpness emphasized signal S*ij to the laser scanner 34. The laser scanner 34 applies a binary laser beam L that is deflected in the main scanning direction to the film F. Since the film F is fed in the auxiliary scanning direction at the same time, halftone dot image information is reproduced over the entire surface of the film F according to output conditions. The halftone dot image on the film F is then developed into a visible image by a developing device (not shown).

According to the image signal processing method of the present invention, as can be understood from the equations (5) through (7) and FIGS. 5(a), 5(d), and 5(e), the original image Sij is selected in the region (≈the region II: upwardly convex) in which the gradient of the tangential line of the image signal Sij decreases and in the region (≈the region III: downwardly convex) in which the gradient of the tangential line increases.

Figure 7:
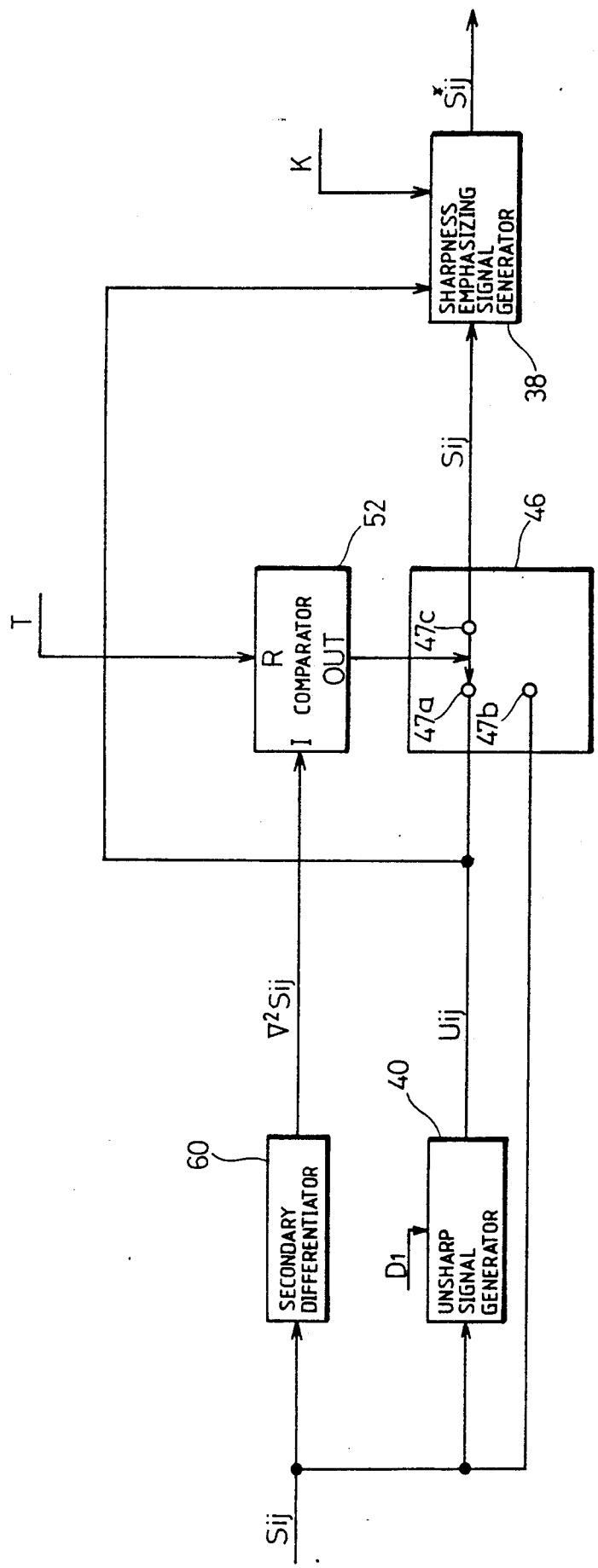
FIGS. 7 through 9 are block diagrams of sharpness emphasizers according to other embodiments of the present invention.

According to another embodiment shown in FIG. 7, a secondary differentiator 60 is connected between the comparator 52 and the magnification converter 28, and a Laplacian output signal $\nabla^2 Sij$ from the second differentiator 60 is applied to the comparison input terminal I of the comparator 52. Such a new image signal generator can produce a new image signal S'ij according to the following equations:

$$\nabla^2 Sij > T \rightarrow S'ij = Sij \quad (11)$$

$$\nabla^2 Sij < -T \rightarrow S'ij = Sij \quad (12)$$

$$-T \leq \nabla^2 Sij \leq T \rightarrow S'ij = Uij \quad (13)$$

Figure 8:
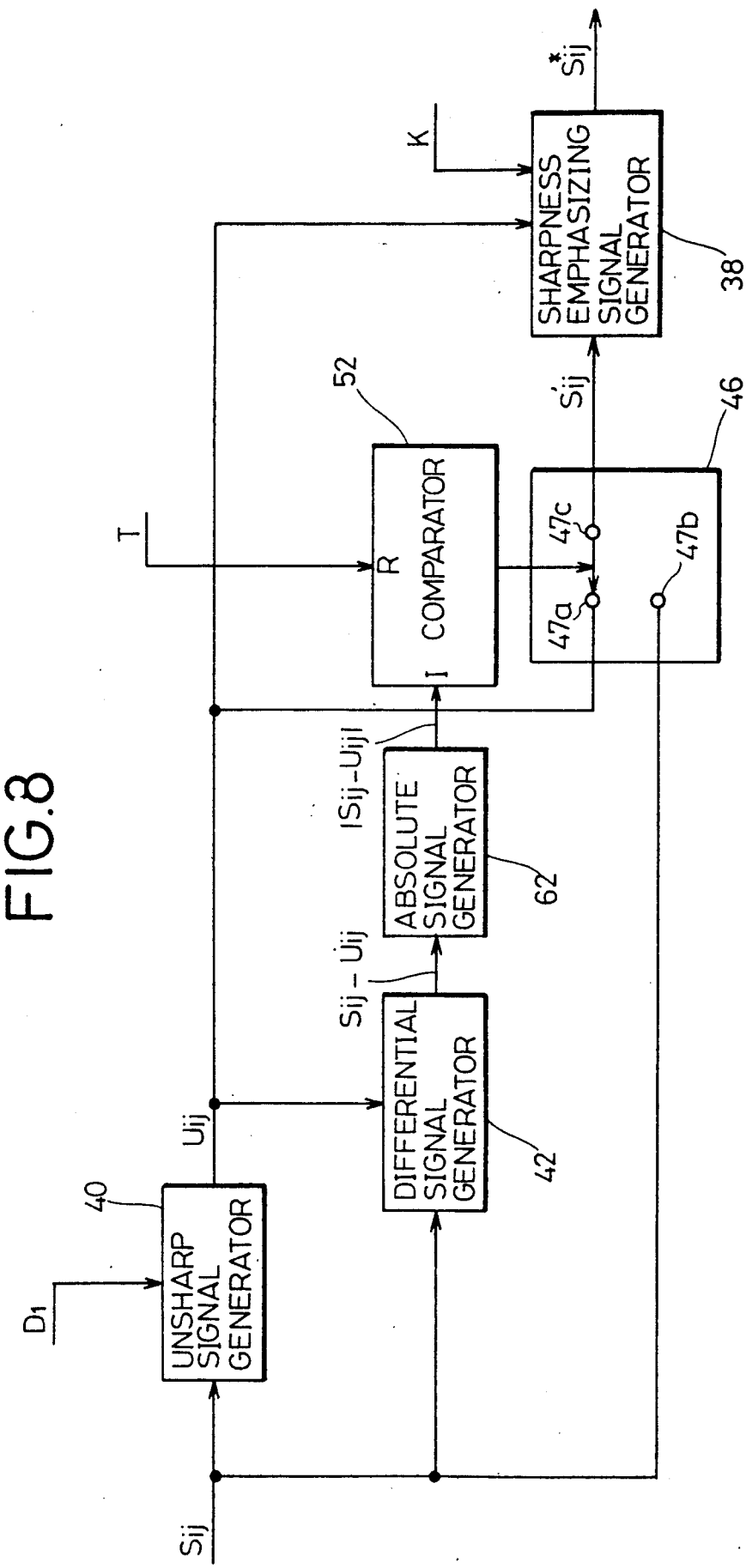
Figure 9:
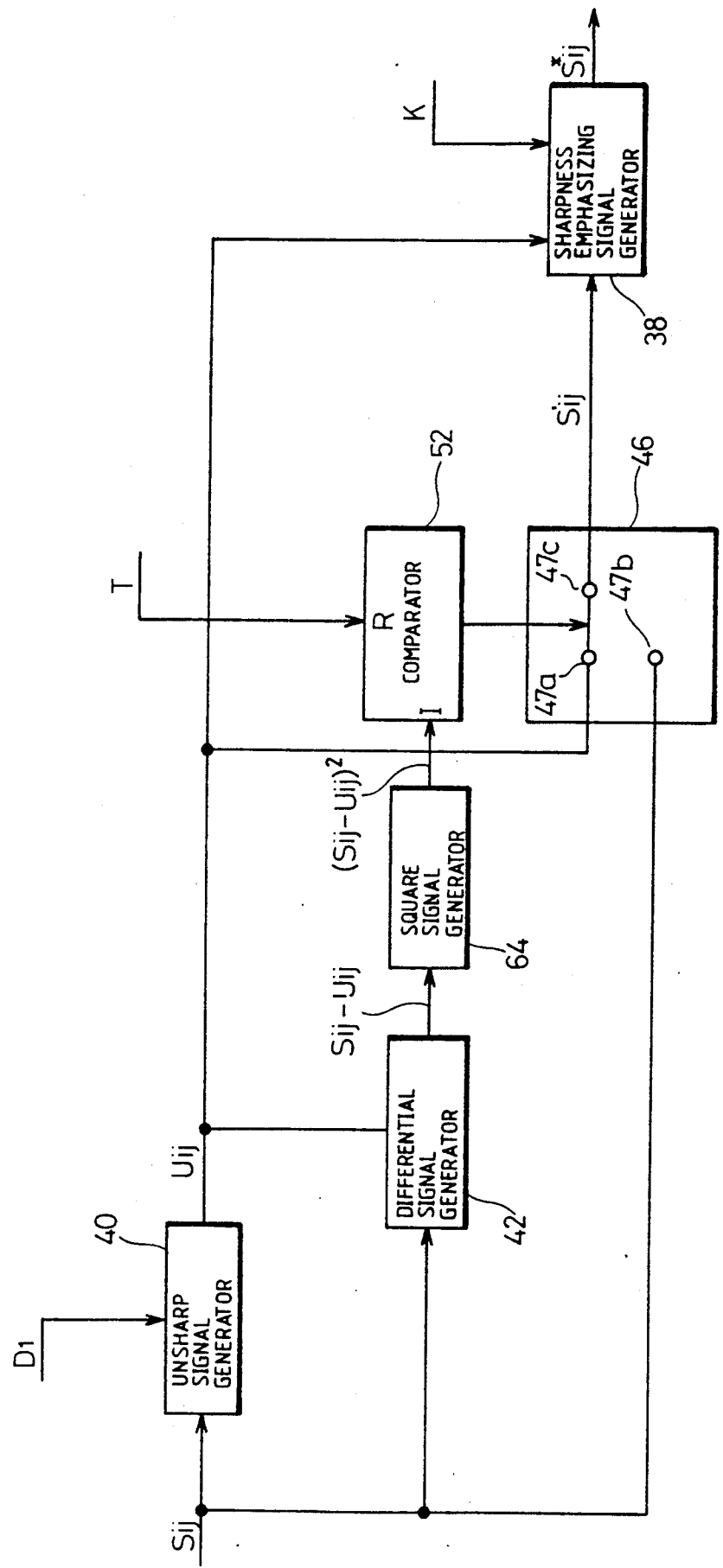

According to still other embodiments shown in FIGS. 8 and 9, an absolute signal generator 62 as an absolute signal generating means (FIG. 8) and a square signal generator 64 as a square signal generating means (FIG. 9), respectively, are connected between the differential signal generator 42 and the comparator 52. The absolute signal generator 62 generates an absolute signal |Sij−Uij|, and the square signal generator 64 generates a square signal (Sij−Uij)². With such arrangements, a new image signal S'ij can be determined according to the following equations:

$$|Sij - Uij| > T \rightarrow S'ij = Sij \quad (14)$$

$$|Sij - Uij| \leq T \rightarrow S'ij = Uij \quad (15)$$

$$(Sij - Uij)^2 > T \rightarrow S'ij = Sij \quad (16)$$

$$(Sij - Uij)^2 \leq T \rightarrow S'ij = Uij \quad (17)$$

In yet another embodiment, the unsharp signal Uij generated by the unsharp signal generator 40 shown in FIGS. 4 and 7 through 9 may be a median signal $U_{medij}$ of an image signal composed of mask size data $D_1$, rather than the local average signal, i.e., the average signal Uaveij of the image signal composed of the mask size data $D^1$. According to this embodiment, a new image signal S'ij may be determined according to the following equations:

$$Sij - Umedij > T \rightarrow S'ij = Sij \quad (18)$$

$$Sij - Umedij < -T \rightarrow S'ij = Sij \quad (19)$$

$$-T \leq Sij - Umedij \leq T \rightarrow S'ij = Umedij \quad (20)$$

The new image signal S'ij is reproduced as a signal with the noise component $S_Nij$ blurred.

With this embodiment, the operator can effect various sharpness emphasis processes when reproducing image information, and can select an optimum sharpness emphasis process when such image information is reproduced.

According to the present invention, as described above, a component of a certain level or below that level, of an image signal produced from an original image and not yet processed for sharpness emphasis, is unsharpened. Therefore, a noise component of the image signal can be unsharpened and hence blurred, whereas a signal component of the image signal can be sharpened or processed for sharpness emphasis, with the result that an image of high quality can be reproduced.

The comparator 52 may be arranged such that the signs ">" and "<" in the inequalities (2) and (3) are replaced with the signs "≧" and "≦", respectively, and the sign "≦" in the inequality (4) with the sign "<".

Although certain preferred embodiments have been shown and described, it should be understood that many changes and modifications may be made therein without departing from the scope of the appended claims.

What is claimed is:

1. A method of processing an image signal in an image scanning apparatus by generating a new image signal ($S'_{ij}$) from an image signal ($S_{ij}$), comprising the steps of:

generating an unsharp signal ($U_{ij}$) based on the image signal ($S_{ij}$), determining whether the configuration of the distribution of the image signal ($S_{ij}$) at a point of interest (i,j) is upwardly convex, or downwardly convex, or otherwise based on the image signal ($S_{ij}$) and the unsharp signal ($U_{ij}$);

employing, as the new image ($S'_{ij}$), the original image signal ($S_{ij}$) at the point of interest (i,j) if the configuration is upwardly convex or downwardly convex; and employing, as the new image signal ($S'_{ij}$), the unsharp signal ($U_{ij}$) if the configuration is otherwise.

2. A method according to claim 1, feurether comprising the step of comparing a differential signal (Sij−Uij) produced by subtracting the unsharp signal (Uij) from the image signal (Sij) with a threshold signal (T) to determine whether the configuration of the distribution of the image signal (Sij) at a point of interest (i, j) is upwardly convex, or a downwardly convex, or otherwise.

3. A method according to claim 1, further comprising the step of comparing the absolute value |Sij−Uij| of a differential signal (Sij−Uij) produced by subtracting the unsharp signal (Uij) from the image signal (Sij) with a threshold signal (T) to determine whether the configuration of the distribution of the image signal (Sij) at a point of interest (i, j) is upwardly convex, or a downwardly convex, or otherwise.

4. A method according to claim 1, wherein said unsharp signal (Uij) comprises an average signal (Uaveij) or a median signal (Umedij) in a region including the point of interest (i, j).

5. A method according to claim 2, wherein said unsharp signal (Uij) comprises an average signal (Uaveij) or a median signal (Umedij) in a region including the point of interest (i, j).

6. A method according to claim 3, wherein said unsharp signal (Uij) comprises an average signal (Uaveij) or a median signal (Umedij) in a region including the point of interest (i, j).

7. A method according to any one of claims 1 through 6, further comprising the step of calculating a sharpness emphasizing signal (S*ij) from the new image signal (S'ij) and the unsharp signal (Uij) according to the equation:

$$S^*ij = S'ij + K(S'ij - Uij)$$

where K is a coefficient signal.

8. An apparatus for processing an image signal, comprising:

unsharp signal generating means for generating an unsharp signal (Uij) from an image signal (Sij);

subtracting means for generating a differential signal (Sij−Uij) by subtracting said unsharp signal (Uij) from said image signal (Sij);

comparing means for comparing said differential signal (Sij−Uij) with a predetermined constant (T); and new image signal selecting means for selecting either said image signal (Sij) or said unsharp signal (Uij) as a new image signal (S'ij) depending on the result of comparison by said comparing means.

9. An apparatus for processing an image signal, comprising:

unsharp signal generating means for generating an unsharp signal (Uij) from an image signal (Sij);

subtracting means for generating a differential signal (Sij−Uij) by subtracting said unsharp signal (Uij) from said image signal (Sij);

absolute signal generating means for generating an absolute signal |Sij−Uij| indicating the absolute value of said differential signal (Sij−Uij);

comparing means for comparing said absolute signal |Sij−Uij| with a predetermined constant (T); and new image signal selecting means for selecting either said image signal (Sij) or said unsharp signal (Uij) as a new image signal (S'ij) depending on the result of comparison by said comparing means.

10. An apparatus according to claim 8, wherein said unsharp signal (Uij) comprises an average signal (Uaveij) or a median signal (Umedij) in a region including the point of interest (i, j).

11. An apparatus according to claim 9, wherein said unsharp signal (Uij) comprises an average signal (Uaveij) or a median signal (Umedij) in a region including the point of interest (i, j).

12. An apparatus according to any one of claims 8 through 11, further comprising subtracting means, multiplying means, and adding means for jointly calculating a sharpness emphasizing signal (S*ij) from the new image signal (S'ij) and the unsharp signal (Uij) according to the equation:

$$S^*ij = S'ij + K(S'ij - Uij)$$

where K is a coefficient signal.

* * * * *